United States Patent
Oishi

(10) Patent No.: US 8,233,628 B2
(45) Date of Patent: Jul. 31, 2012

(54) INFORMATION PROCESSING APPARATUS AND INFORMATION PROCESSING METHOD

(75) Inventor: Kazuomi Oishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 833 days.

(21) Appl. No.: 12/133,835

(22) Filed: Jun. 5, 2008

(65) Prior Publication Data

US 2009/0136040 A1    May 28, 2009

(30) Foreign Application Priority Data

Jun. 6, 2007   (JP) ................. 2007-150779

(51) Int. Cl.
*H04L 9/00* (2006.01)
(52) U.S. Cl. ............... 380/277; 380/259; 380/278
(58) Field of Classification Search .......... 380/259, 380/277–278
See application file for complete search history.

(56) References Cited

U.S. PATENT DOCUMENTS

| | | | |
|---|---|---|---|
| 5,995,623 A * | 11/1999 | Kawano et al. ........... 713/189 |
| 7,672,460 B2 * | 3/2010 | Furukawa et al. ........... 380/281 |
| 7,823,190 B1 * | 10/2010 | Kacarov et al. ........... 726/6 |
| 2002/0002468 A1 * | 1/2002 | Spagna et al. ........... 705/1 |
| 2005/0065943 A1 * | 3/2005 | Miyata et al. ........... 707/100 |
| 2007/0055867 A1 * | 3/2007 | Kanungo et al. ........... 713/156 |

FOREIGN PATENT DOCUMENTS

| | | |
|---|---|---|
| JP | A10-231778 | 9/1998 |
| JP | 2004111524 | * 4/2004 |

* cited by examiner

*Primary Examiner* — Carl Colin
*Assistant Examiner* — John Elmore
(74) *Attorney, Agent, or Firm* — Fitzpatrick, Cella, Harper & Scinto

(57) ABSTRACT

Encrypted text data c1 generated by encrypting plaintext data using an encryption key, verification data having a size smaller than the encrypted text data c1, and encrypted text data c2 generated by encrypting the verification data using the encryption key are acquired (S601). It is checked if a decryption result of the encrypted text data c2 using a decryption key matches the verification data (S607). If it is determined that the two data match, the encrypted text data c1 is decrypted using the decryption key (S608).

3 Claims, 4 Drawing Sheets

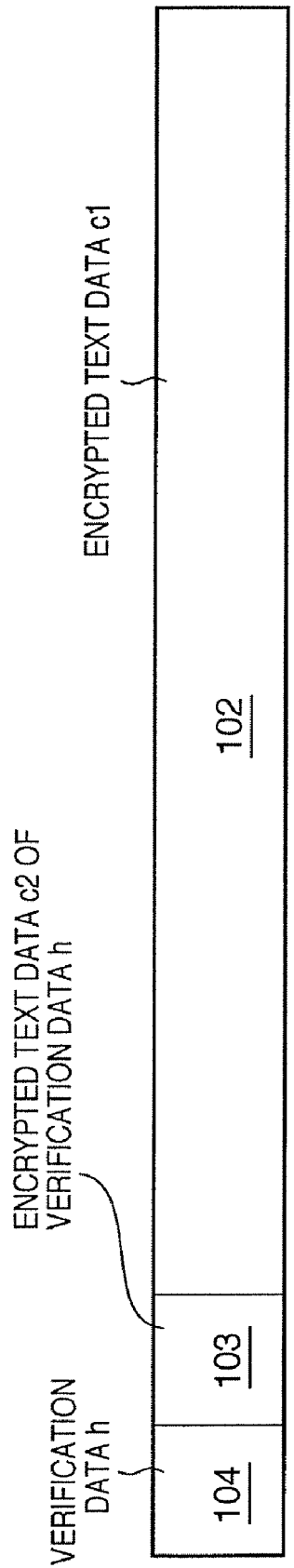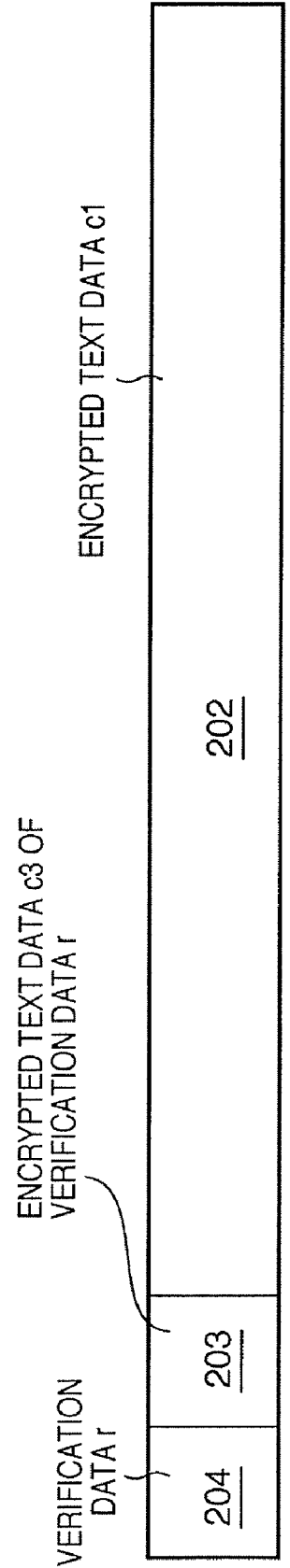

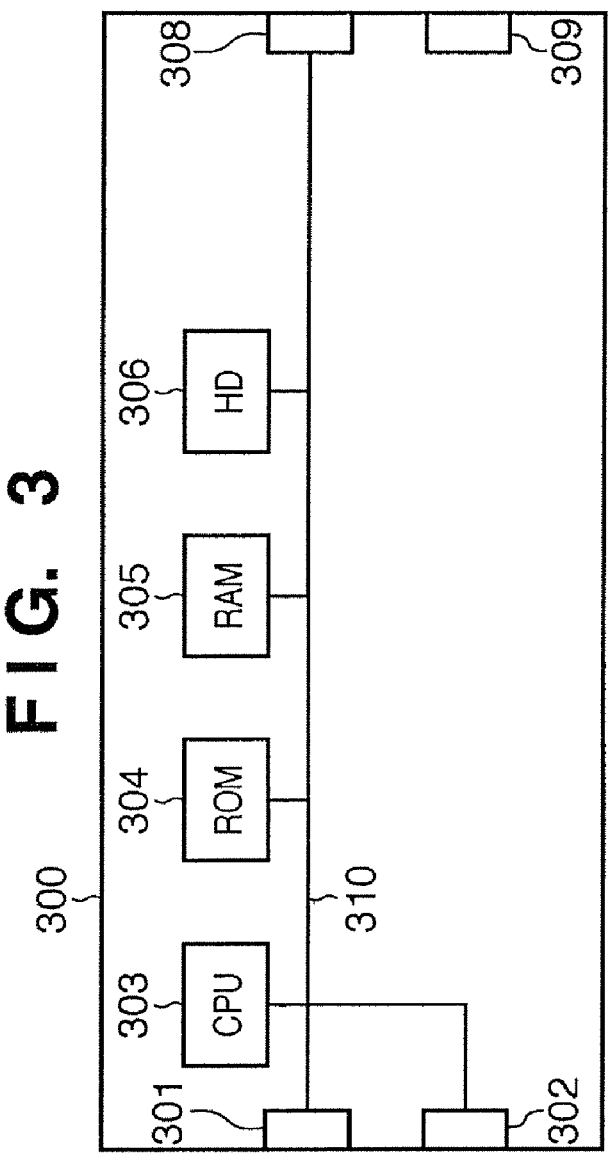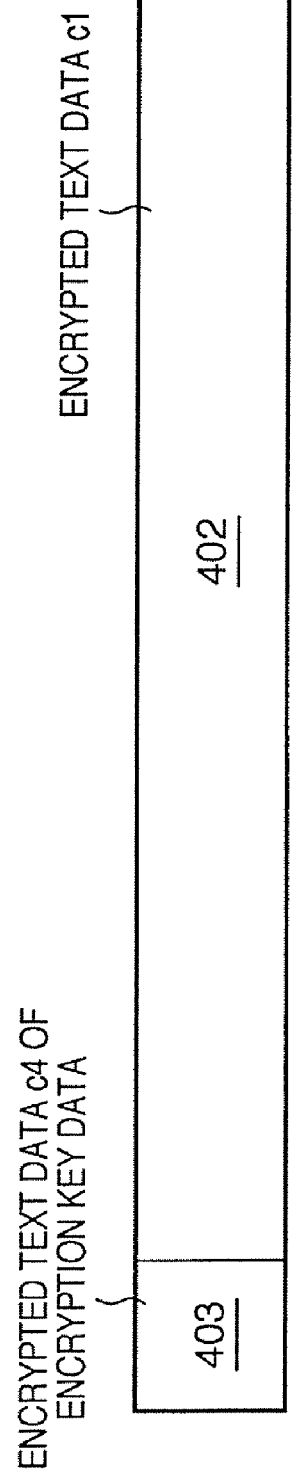

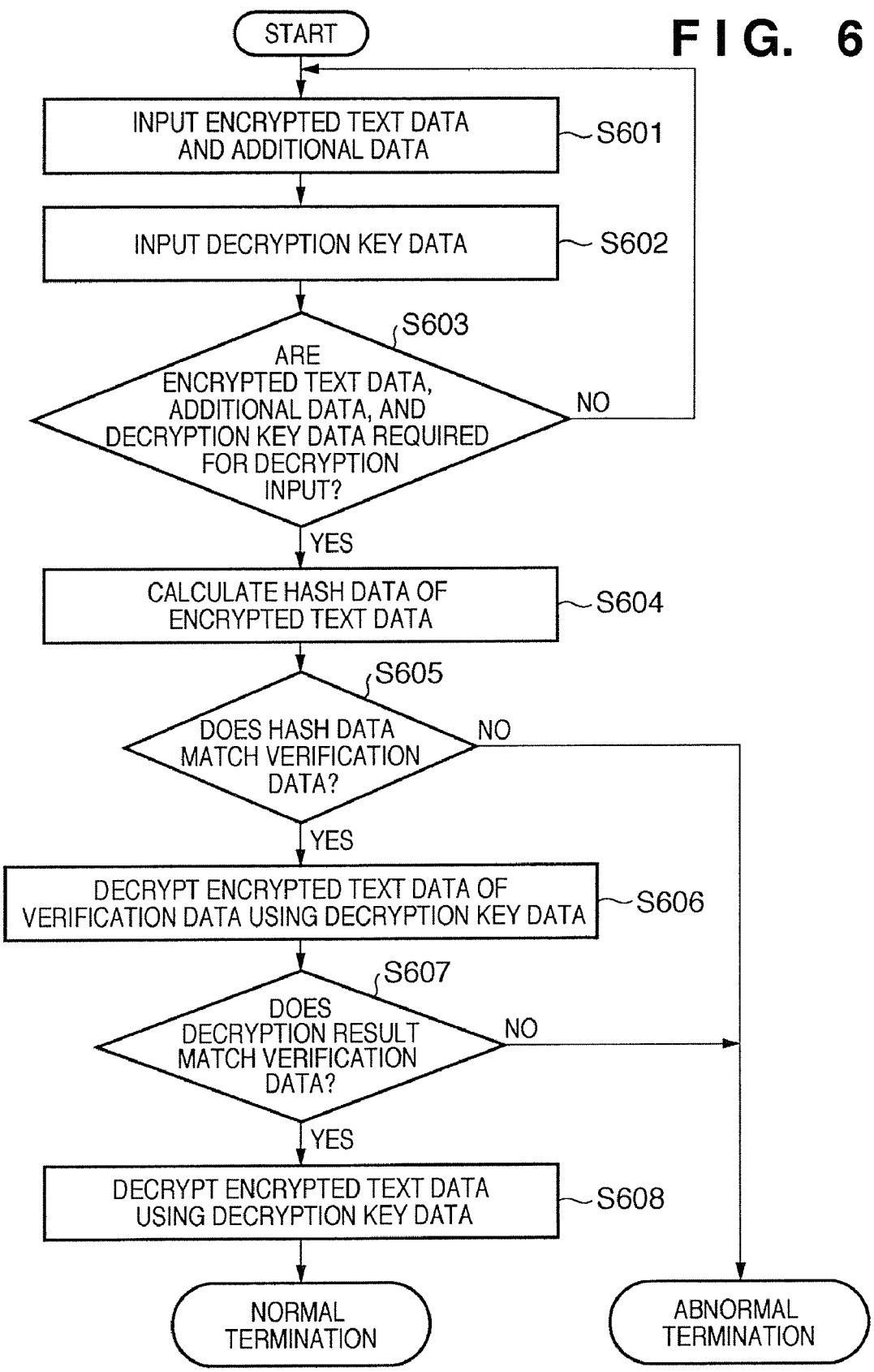

INFORMATION PROCESSING APPARATUS AND INFORMATION PROCESSING METHOD

BACKGROUND OF THE INVENTION

1. Field of the Invention

The present invention relates to a technique that handles data encrypted using a key.

2. Description of the Related Art

Conventionally, as a method of verifying, when encrypted data (encrypted text data) and a key are input, if this key is required to correctly decrypt the encrypted text data, the following method is generally used. That is, a method of verifying the key by decrypting the encrypted text data using the key and determining if the decrypted result is correct is used. Japanese Patent Laid-Open No. 10-231778 discloses a method of finding, when the encrypted text data cannot be correctly decrypted, where an error has occurred in an encryption process.

However, the conventional verification method can only execute verification after the encrypted text data is decrypted to obtain the decrypted result, i.e., full encryption source data (plaintext data). For example, this is the case when plaintext data is image data, and determination is made using an image data display program that executes display processing after full image data is input. In this case, when the relationship between the key and encrypted text data is not correct for some reason, if the decryption processing of this encrypted text data is executed using this key, the decrypted result is not original plaintext data, thus wasting a time and computation spent for decryption. Furthermore, if this occurs when the size of encrypted text data is large, the process performance deteriorates considerably.

SUMMARY OF THE INVENTION

The present invention has been made in consideration of the aforementioned problems, and has as its object to provide a technique for more easily and quickly verifying, when encrypted data (encrypted text data) and a key are input, if this key can correctly decrypt the encrypted text data.

According to one aspect of the present invention, there is provided an information processing apparatus comprises:

acquisition unit adapted to acquire first encrypted data generated by encrypting first data using a first key, second data having a size smaller than the first data, and second encrypted data generated by encrypting the second data using the first key;

decryption unit adapted to generate second decrypted data by decrypting the second encrypted data using a second key; and determination unit adapted to determine whether or not the second data matches the second decrypted data, wherein the decryption unit further decrypts the first encrypted data using the second key in accordance with a result of the determination unit.

According to another aspect of the present invention, there is provided an information processing apparatus comprises:

acquisition unit adapted to acquire first encrypted data generated by encrypting first data using a first key, and second encrypted data generated by encrypting data of the first key using the first key;

decryption unit adapted to generate second decrypted data by decrypting the second encrypted data using a second key; and determination unit adapted to determine whether or not the data of the second key and the second decrypted data have a predetermined relationship, wherein the decryption unit decrypts the first encrypted data using the second key in accordance with a result of the determination unit.

According to still another aspect of the present invention, there is provided an information processing method comprises:

an acquisition step of acquiring first encrypted data generated by encrypting first data using a first key, second data having a size smaller than the first data, and second encrypted data generated by encrypting the second data using the first key;

a first decryption step of generating second decrypted data by decrypting the second encrypted data using a second key;

a determination step of determining whether or not the second data matches the second decrypted data; and a second decryption step of decrypting, when it is determined in the determination step that the two data match, the first encrypted data using the second key.

According to yet another aspect of the present invention, there is provided an information processing method wherein comprises:

an acquisition step of acquiring first encrypted data generated by encrypting first data using a first key, and second encrypted data generated by encrypting data of the first key using the first key;

a first decryption step of generating second decrypted data by decrypting the second encrypted data using a second key;

a determination step of determining whether or not the data of the second key and the second decrypted data have a predetermined relationship; and a second decryption step of decrypting, when it is determined in the determination step that the two data have the predetermined relationship, the first encrypted data using the second key.

Further features of the present invention will become apparent from the following description of exemplary embodiments with reference to the attached drawings.

BRIEF DESCRIPTION OF THE DRAWINGS

FIG. 1 shows an example of the configuration of a data packet when verification data h, encrypted text data c2 of the verification data h, and encrypted text data c1 of plaintext data are output together as one data packet in step S507;

FIG. 2 shows an example of the configuration of a data packet when verification data r, encrypted text data c3 of the verification data r, and encrypted text data c1 of plaintext data are output together as one data packet in step S507;

FIG. 3 is a block diagram showing the hardware arrangement of a computer which serves as an information processing apparatus according to the first embodiment of the present invention;

FIG. 4 shows an example of the configuration of a data packet when encrypted text data c4 of encryption key data, and encrypted text data c1 of plaintext data are output together as one data packet in step S507;

FIG. 6 is a flowchart showing decryption processing, i.e., processing for decrypting encrypted text data c1 of plaintext data, as another information processing method to be executed by the computer 300.

DESCRIPTION OF THE EMBODIMENTS

Figure 5:
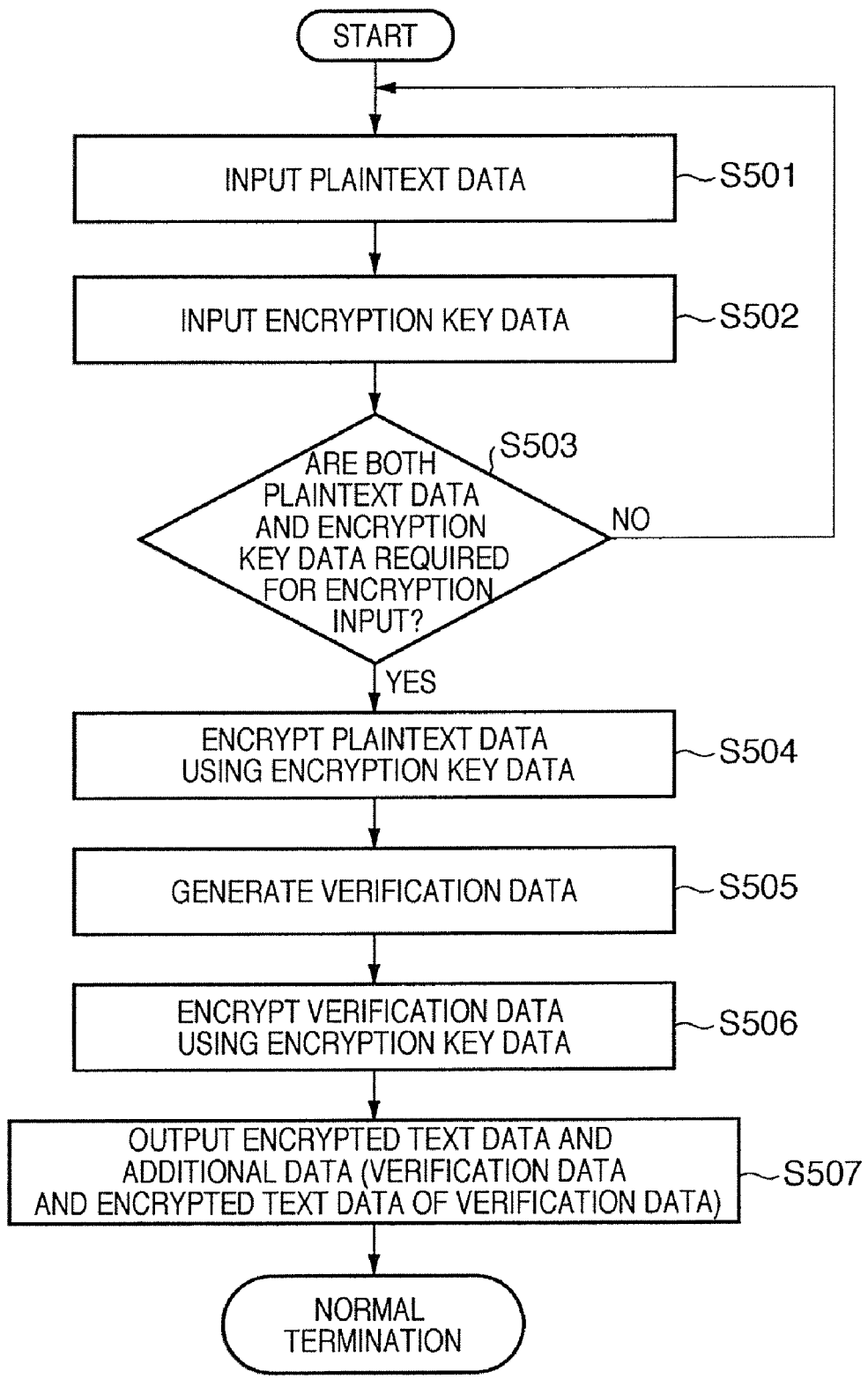
FIG. 5 is a flowchart showing encryption processing as one information processing method to be executed by a computer 300.

Preferred embodiments of the present invention will be described in detail hereinafter with reference to the accompanying drawings. Note that the embodiments will be explained as examples of the preferred arrangement of the invention described in the scope of the claims, and the invention is not limited to the embodiments to be described hereinafter.

[First Embodiment]

FIG. 3 is a block diagram showing the hardware arrangement of a computer which serves as an information processing apparatus according to this embodiment. As such computer, a PC (personal computer), WS (workstation), and the like may be used.

Referring to FIG. 3, reference numeral 300 denotes a computer, which comprises a CPU 303, ROM 304, RAM 305, HD (hard disk) 306, and network interfaces 301 and 302. Furthermore, the computer 300 comprises an interface 308 used to connect a keyboard and a pointing device such as a mouse or the like, and an interface 309 used to connect a display device such as a CRT, liquid crystal display, or the like. The aforementioned units are connected to a bus 310.

The CPU 303 controls the overall computer 300 using programs (computer programs) and data stored in the ROM 304 and RAM 305, and executes respective processes to be described later, which will be explained as those to be implemented by the computer 300.

The ROM 304 stores setting data, a boot program, and the like of the computer 300.

The RAM 305 has an area for temporarily storing programs and data loaded from the HD 306, those which are externally received via the network interfaces 301 and 302, and the like. Furthermore, the RAM 305 has a work area used when the CPU 303 executes respective processes. That is, the RAM 305 can provide various areas as needed.

The HD 306 saves an OS (operating system), and programs and data required to make the CPU 303 execute respective processes to be described later as those to be implemented by the computer 300. The programs and data saved in the HD 306 are loaded onto the RAM 305 as needed under the control of the CPU 303. The CPU 303 executes various processes using the programs and data loaded onto the RAM 305.

Upon connecting the computer 300 to a network, this computer 300 serves as either a host or router. When the computer 300 serves as a router, both the network interfaces 301 and 302 are required; when it serves as a host, the network interface 302 is omitted.

Note that the arrangement of the computer 300 is not limited to that shown in FIG. 3, and various other arrangements may be used.

Terms used in the following description will be defined. In the following description, a technique for converting and inversely converting data using a key so that only an intended partner can understand will be referred to as an "encryption technique". Data which is to be converted using a key, and is content data such as an image or the like will be referred to as "plaintext data", and the data after conversion will be referred to as "encrypted data (encrypted text data)". Conversion of plaintext data into encrypted text data will be referred to as "encryption", a key used upon encryption will be referred to as an "encryption key", inverse conversion of encrypted text data into plaintext data will be referred to as "decryption", and a key used upon decryption will be referred to as a "decryption key". Note that "Breaking encrypted text data" is to obtain plaintext data from encrypted text data without using any decryption key, and is different from decryption. Furthermore, cryptosystem in which encryption and decryption keys are identical is a symmetric cryptosystem, and cryptosystem in which encryption and decryption keys are different, and the encryption key can be published will be referred to as an asymmetric cryptosystem.

Encryption processing as one information processing method to be executed by the computer 300 will be described below with reference to FIG. 5 which shows the flowchart of that processing. Note that a program and data required to make the CPU 303 execute the processing according to the flowchart of FIG. 5 are saved in the HD 306. Such program and data are loaded onto the RAM 305 as needed under the control of the CPU 303. Since the CPU 303 executes the processing using the loaded program and data, the computer 300 implements processes to be described below.

In step S501, the CPU 303 acquires plaintext data (first data) in the RAM 305. Various methods of acquiring plaintext data in the RAM 305 may be used, and the present invention is not particularly limited to a specific method. For example, the CPU 303 may load, as plaintext data, data of an image, which is designated using the keyboard or mouse by the user of the computer 300 from a plurality of images saved in advance in the HD 306, from the HD 306 onto the RAM 305.

In step S502, the CPU 303 acquires data of an encryption key (first key) used to encrypt the plaintext data acquired in step S501 in the RAM 305. Various methods of acquiring the encryption key data in the RAM 305 may also be used, and the present invention is not particularly limited to a specific method. For example, the CPU 303 may load encryption key data, which is designated using the keyboard or mouse by the user of the computer 300 from a plurality of encryption key data saved in advance in the HD 306, from the HD 306 onto the RAM 305.

The CPU 303 checks in step S503 if the acquisition processes in both steps S501 and 502 are normally done. That is, the CPU 303 checks if the RAM 305 stores the plaintext data and the encryption key data used to encrypt this plaintext data. As a result of checking, if the plaintext data and encryption key data are acquired in the RAM 305, the process advanc to step S504; otherwise, the process returns to step S501.

In step S504, the CPU 303 encrypts the plaintext data acquired in step S501 using the encryption key data acquired in step S502 to obtain encrypted text data c1 of the plaintext data. When the plaintext data is large-size data, it may be divided into a plurality of data, and the divided data may be parallelly or sequentially encrypted. In such case, the process in subsequent step S505 may be executed parallel to that in step S504.

In step S505, the CPU 303 inputs the encrypted text data c1 of the plaintext data to a known hash function to generate hash data of the encrypted text data c1 of the plaintext data as verification data h. Various hash functions are available, and this embodiment can be applied if any of these functions is used. A hash function having higher security to encryption is preferably used. Hence, as a hash function, cryptographically secure, one-way hash functions such as SHA-256, SHA-384, SHA-512, and the like are preferably used.

It is important that the data size of the verification data h is sufficiently smaller than that of the plaintext data.

In step S506, the CPU 303 encrypts the verification data h generated in step S505 using the encryption key data acquired in step S502 to obtain encrypted text data c2 of the verification data h.

In step S507, the CPU 303 packetizes the verification data h and the encrypted text data c2 of the verification data h to form additional data, and outputs the additional data and the encrypted text data c1 of the plaintext data to the HD 306 or externally via the network interfaces 301 and 302. Note that the output destination in step S507 is not particularly limited.

FIG. 1 shows an example of the configuration of a data packet when the verification data h, the encrypted text data c2 of the verification data h, and the encrypted text data c1 of the plaintext data are output together as one data packet in step S507. Referring to FIG. 1, reference numeral 104 denotes a field which stores the verification data h; 103, a field which stores the encrypted text data c2 of the verification data h; and 102, a field which stores the encrypted text data c1 of the plaintext data. Note that information for specifying the fields 102 to 104 in the data packet, e.g., that for specifying the start positions of the fields 102 to 104 is included in a header (not shown) appended to this data packet. Note that the verification data h, the encrypted text data c2 of the verification data h, and the encrypted text data c1 of the plaintext data need not always be output together as one data packet in this way, but they may be individually output.

Decryption processing, i.e., processing for decrypting the encrypted text data c1 of the plaintext data as another information processing method to be executed by the computer 300 will be described below with reference to FIG. 6 which shows the flowchart of that processing. Note that a program and data required to make the CPU 303 execute the processing according to the flowchart of FIG. 6 are saved in the HD 306. Such program and data are loaded onto the RAM 305 as needed under the control of the CPU 303. Since the CPU 303 executes the processing using the loaded program and data, the computer 300 implements processes to be described below.

In step S601, the CPU 303 acquires the verification data h (second data), the encrypted text data c2 (second encrypted data) of the verification data h, and the encrypted text data c1 (first encrypted data) of the plaintext data, which are output in step S507, in the RAM 305. As the acquisition processing, various processes may be used, and the present invention is not particularly limited to specific processing. For example, when the verification data h, the encrypted text data c2 of the verification data h, and the encrypted text data c1 of the plaintext data are stored in the HD 306, the CPU 303 loads them onto the RAM 305.

In step S602, the CPU 303 acquires data of a decryption key (second key) used to decrypt the encrypted text data c2 of the verification data h and the encrypted text data c1 of the plaintext data. As a method of acquiring the decryption key data in the RAM 305, various methods may also be used, and the present invention is not particularly limited to a specific method. For example, the CPU 303 may load decryption key data, which is designated using the keyboard or mouse by the user of the computer 300 from a plurality of decryption key data saved in advance in the HD 306, from the HD 306 onto the RAM 305.

The CPU 303 checks in step S603 if the acquisition processes in both steps S601 and S602 are normally done. That is, the CPU 303 checks if the RAM 305 stores the verification data h, the encrypted text data c2 of the verification data h, the encrypted text data c1 of the plaintext data, and the decryption key data. As a result of checking if the verification data h, the encrypted text data c2 of the verification data h, the encrypted text data c1 of the plaintext data, and the decryption key data are acquired in the RAM 305, the process advances to step S604; otherwise, the process returns to step S601.

In step S604, the CPU 303 inputs the encrypted text data c1 of the plaintext data to the hash function used in step S505 to generate hash data of the encrypted text data c1.

The CPU 303 checks in step S605 if the hash data generated in step S604 matches the verification data h acquired in step S601. As a result of checking, if the CPU 303 determines that the two data do not match, it aborts the subsequent processing, thus terminating the processing as an error. Processing to be executed when the data do not match is not particularly limited. For example, a message indicating that the two data do not match may be displayed on the display device connected to the interface 309.

On the other hand, if the CPU 303 determines in step S605 that the two data match, the process advances to step S606 to permit execution of the subsequent processing. Note that the processes in steps S604 and S605 are verification processes for verifying the presence/absence of any attack on the encrypted text data c1 of the plaintext data and the like, and are not indispensable in this embodiment. Hence, these steps may be omitted as needed.

In step S606, the CPU 303 decrypts the encrypted text data c2 of the verification data h using the decryption key data acquired in step S602 (first decryption step). Data obtained as a result of this decryption will be referred to as decrypted data d (second decrypted data) hereinafter.

The CPU 303 checks in step S607 if the decrypted data d obtained in step S606 matches the verification data h acquired in step S601. As a result of checking, if the CPU 303 determines that the two data do not match, it aborts the subsequent processing, thus terminating the processing as an error. Processing to be executed when the data do not match is not particularly limited. For example, a message indicating that the two data do not match may be displayed on the display device connected to the interface 309.

On the other hand, as a result of checking in step S607, if the CPU 303 determines that the two data match, the process advances to step S608.

In step S608, the CPU 303 decrypts the encrypted text data c1 of the plaintext data using the decryption key data (second decryption step). That is, since the decrypted data d obtained by decrypting the encrypted text data c2 of the verification data h using this decryption key data matches the verification data h, it is determined that the decryption key data can be used to decrypt plaintext data from the encrypted text data c1.

Upon encrypting different plaintext data, different keys are used. Either the symmetric cryptosystem or asymmetric cryptosystem may be used.

In this embodiment, the encrypted text data c1, the verification data h (hash data h), and the encrypted text data c2 of the verification data h are associated with each other. Therefore, it is difficult for a person who does not know an encryption key to forge the encrypted text data c1, the hash data h, and the encrypted text data c2 of the verification data h which allow the decryption processing to normally terminate. For example, even when such person forges the encrypted text data c1 and obtains its hash data h, if he or she does not know an encryption key, he or she cannot calculate the encrypted text data c2 of the hash data h.

Assume that there is an attacker who acquired the hash data h corresponding to a certain encryption key and its encrypted text data c2. Even when this attacker attempts to forge the encrypted text data c1 to obtain this hash data h, if the hash function used is a cryptographically secure, one-way hash function, it is difficult for him or her to find such encrypted text data c1. Therefore, an attack that results in a wasteful time and computation cannot be made, and such attack can be detected.

As described above, according to this embodiment, verification as to whether or not a given decryption key is required to correctly decrypt encrypted text data of plaintext data can be executed without decrypting the encrypted text data of the plaintext data.

Since the data size of the verification data is smaller than that of the plaintext data, the time required to decrypt the encrypted text data of the verification data can be shorter than that required to decrypt the encrypted text data of the plaintext data. Therefore, the processing for decrypting the encrypted text data of the verification data is executed using the decryption key in place of the encrypted text data of the plaintext data to check if the decrypted result matches the verification data. If they match, it is determined (verified) that the encrypted text data of the plaintext data can be correctly decrypted using the decryption key used in that decryption. Therefore, as a result, that verification can be implemented without decrypting the encrypted text data of the plaintext data having the data size larger than the verification data. The present invention has a larger effect as the difference between the data sizes of the plaintext data and verification data is larger.

In this embodiment, the encryption processing and decryption processing are implemented when the CPU 303 executes the programs that run on the computer 300. For example, when such programs are function programs for encryption and decryption, these function programs may run when a main body program (e.g., an image edit program) passes arguments such as a pointer to plaintext data, that to encryption key data, and the like to these programs.

On the other hand, upon hardware implementation of the encryption processing and decryption processing using an LSI or the like, hardware components may operate by inputting a signal indicating plaintext data, that indicating an encryption key, and the like to the hardware components.

[Second Embodiment]

In the first embodiment, hash data of encrypted text data of plaintext data is used as verification data. That is, the verification data is related to the plaintext data. However, the verification data may be data unrelated to the plaintext data.

In this embodiment, as an example of verification data unrelated to plaintext data, a random number is used.

The encryption processing executed when a random number is used as verification data is basically the same as that shown in the flowchart of FIG. 5, except that a CPU 303 generates an appropriate random number in step S505 as verification data r. In step S506, the CPU 303 encrypts the verification data r using encryption key data acquired in step S502 to obtain encrypted text data c3 of the verification data r.

FIG. 2 shows an example of the configuration of a data packet when the verification data r, the encrypted text data c3 of the verification data r, and encrypted text data c1 of plaintext data are output together as one data packet in step S507. Referring to FIG. 2, reference numeral 204 denotes a field which stores the verification data r; 203, a field which stores the encrypted text data c3 of the verification data r; and 202, a field which stores the encrypted text data c1 of the plaintext data. Note that information for specifying the fields 202 to 204 in the data packet, e.g., that for specifying the start positions of the fields 202 to 204 is included in a header (not shown) appended to this data packet. Note that the verification data r, the encrypted text data c3 of the verification data r, and the encrypted text data c1 of the plaintext data need not always be output together as one data packet in this way, but they may be individually output.

On the other hand, the decryption processing according to this embodiment is basically the same as that shown in the flowchart of FIG. 6, except that the processes in steps S604 and S605 are omitted, the verification data r is used in place of the verification data h, and the encrypted text data c3 is used in place of the encrypted text data c2.

In the encryption processing and decryption processing according to this embodiment, since verification data is generated by "random number generation processing", the processing speed of which is higher than the hash data calculation processing, the encryption processing and decryption processing can be executed faster than those according to the first embodiment.

However, since a set of the verification data r and the encrypted text data c3 of the verification data r is unrelated to the encrypted text data c1, the following attack may be made. That is, an attacker who acquired data including encrypted text data c1 created using a certain encryption key k, verification data r, and encryption text data c3 of the verification data r, substitutes the encryption text data c1 for another encryption key data, e.g., random number data. Upon decryption, the encryption text data c3 is decrypted using a decryption key corresponding to the encryption text data c1 to check if the decryption result match the verification data r. However, even when it is determined that the two data match, since the random number data substituting the encrypted text data c1 is decrypted using the decryption key, the decryption result definitely does not match plaintext data. That is, original plaintext data cannot be obtained. In this way, an attack that makes results in a wasteful time and computation may be made.

Note that different keys are used upon encrypting different plaintext data. Also, different random numbers are used for different plaintext data.

[Third Embodiment]

In this embodiment, assuming that encryption and decryption keys are the same, no verification data is generated, and encrypted text data c4 of an encryption key is generated in place of the encryption text data c2 in the first embodiment and the encryption text data c3 in the second embodiment.

The encryption processing according to this embodiment has the following difference from the first embodiment in the flowchart of FIG. 5. That is, the process in step S505 is omitted, and in step S506, a CPU 303 encrypts data of an encryption key acquired in step S502 using this encryption key data, thus obtaining encrypted text data c4 of the encryption key.

FIG. 4 shows an example of the configuration of a data packet when the encrypted text data c4 of the encryption key data, and encrypted text data c1 of plaintext data are output together as one data packet in step S507. Referring to FIG. 4, reference numeral 403 denotes a field which stores the encrypted text data c4 of the encryption key data; and 402, a field which stores the encrypted text data c1 of the plaintext data. Note that information for specifying the fields 402 and 403 in the data packet, e.g., that for specifying the start positions of the fields 402 and 403 is included in a header (not shown) appended to this data packet. Note that the encrypted text data c4 of the encryption key data and the encrypted text data c1 of the plaintext data need not always be output together as one data packet in this way, but they may be individually output.

On the other hand, the decryption processing according to this embodiment has the following differences from the first embodiment in the flowchart of FIG. 6. In step S601, the CPU 303 acquires the encrypted text data c1 and c4. The CPU 303 checks in step S603 if the encrypted text data c1 and c4 and decryption key data are acquired in a RAM 305.

Then, steps S604 and S605 are omitted. In step S606, the CPU 303 decrypts the encrypted text data c4 of the encryption key data using the decryption key data. In step S607, the CPU 303 compares the decryption result of the encrypted text data c4 with the decryption key data. Since it is assumed that the encryption and decryption key data are the same, if the decryption result of the encrypted text data c4 matches the decryption key data, it is determined that this decryption key data is correct decryption key data required to decrypt the plaintext data. Therefore, if the decryption result of the encrypted text data c4 matches the decryption key data, the process advances to step S608. On the other hand, if they do not match, the process terminates as an error.

In the encryption processing and decryption processing according to this embodiment, since no hash data calculation processing is required, the encryption processing and decryption processing can be executed faster than those according to the first embodiment. In this embodiment, since the data packet does not include any verification data, the size of the data packet can be smaller than those in the first and second embodiments.

However, since the encrypted text data c4 of the encryption key is not generated from the encrypted text data c1 of the plaintext data, these data are unrelated. Therefore, the following attack may be made.

An attacker who acquired encrypted text data c1 created using a certain encryption key k and encrypted text data c4 of the encryption key, substitutes the encrypted text data c1 of plaintext data for another encrypted text data, e.g., a random number. Upon decryption, the encrypted text data c4 is decrypted using a decryption key corresponding to the encrypted text data c1 to check if the decryption result matches the decryption key data. However, even when it is determined that they match, since the random number data substituting the encrypted text data c1 is decrypted using this decryption key data, this decryption result definitely does not match plaintext data. That is, original plaintext data cannot be obtained. In this way, an attack that results in a wasteful time and computation may be made.

Note that different key data are used upon encrypting different plaintext data.

In this embodiment, the encryption and decryption keys are the same, but they may be different. In this case, if the relationship between the encryption and decryption keys (inter-key relationship) is known in advance, the CPU 303 need only check in step S607 if the relationship between the decryption result of the encrypted text data c4 and the decryption key data meets the inter-key relationship. As this checking processing, for example, the following processing is available.

For example, upon encryption using an asymmetric cryptosystem such as an RSA public key cryptosystem, the following processing is executed.

In RSA encryption, an encryption key is expressed by (e, N) and a decryption key is expressed by (d, N) where N is the product of large prime numbers p and q, and e is a prime number equal to or larger than 3. Letting L be the least common multiple of (p−1) and (q−1), $e \times d \equiv 1 \pmod{L}$. $A \equiv B \pmod{C}$ indicates that the difference between A and B is an integer multiple of C (letting k be an integer, $A - B = k \times C$). Encryption of plaintext M is calculated by $M^e \bmod N$, and decryption of encrypted text C is calculated by $C^d \bmod N$. $A = B \bmod C$ indicates that the remainder obtained by dividing B by C is A. When this processing is actually used as a cryptosystem, RSA-OAEP using a method called OAEP (Optimal Asymmetric Encryption Padding) is preferable in terms of security.

RSA-OAEP can be applied to this embodiment as follows.

Let c1 be encrypted text data obtained by encrypting plaintext data by RSA-OAEP. Focusing attention on d of a decryption key (d, N), let c4 be encrypted text data obtained by encrypting d by RSA-OAEP. After c1 and c4 are acquired, c4 is decrypted by RSA-OAEP. Since (d, N) is used upon decryption, it is confirmed if the decryption result of c4 matches d. After the confirmation, c1 is decrypted by RSA-OAEP. In this application method, an encryption key (e, N) is different from the decryption key (d, N), and whether or not they satisfy a predetermined relationship, i.e., the relationship between the encryption and decryption keys of RSA-OAEP is checked.

Alternatively, another method of applying RSA-OAEP to this embodiment as follows is available. Let c1 be encrypted text data obtained by encrypting plaintext data by RSA-OAEP. Focusing attention on e of an encryption key (e, N), let c4 be encrypted text data obtained by encrypting e by RSA-OAEP. After c1 and c4 are acquired, c4 is decrypted by RSA-OAEP. It is confirmed if the decryption result of c4 matches d.

After the confirmation, c1 is decrypted by RSA-OAEP. In this another application method, the encryption key (e, N) is different from a decryption key (d, N), and whether or not they satisfy a predetermined relationship, i.e., the relationship between the encryption and decryption keys of RSA-OAEP is checked.

Similar application methods are not limited to RSA-OAEP, and can be configured using secure public key cryptosystems.

That is, when data of an encryption key is used as a public key of the public key cryptosystem, data of a decryption key is used as a private key paired with the public key. Since the decryption result in case of successful decryption is the public key, it can be checked in step S607 if the decryption result is a public key paired with a private key as data of a decryption key.

[Other Embodiments]

The objects of the present invention can be achieved as follows. That is, a recording medium (or storage medium), which records a program code of software that can implement the functions of the above-mentioned embodiments is supplied to a system or apparatus. Such storage medium is a computer-readable storage medium. A computer (or a CPU or MPU) of the system or apparatus reads out and executes the program code stored in the recording medium. In this case, the program code itself read out from the recording medium implements the functions of the above-mentioned embodiments, and the recording medium which records the program code constitutes the present invention.

When the computer executes the readout program code, an operating system (OS) or the like running on the computer performs some or all of actual processing operations based on an instruction of the program code. The present invention also includes a case wherein the functions of the above-mentioned embodiments are implemented by this processing.

Furthermore, assume that the program code read out from the recording medium is written in a memory of a function expansion card or a function expansion unit, which is inserted in or connected to the computer. After that, the functions of the above-mentioned embodiments are implemented by some or all of actual processing operations executed by a CPU or the like arranged in the function expansion card or function expansion unit based on an instruction of the program code. Such case is also included in the present invention.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-150779 filed Jun. 6, 2007 which is hereby incorporated by reference herein in its entirety.

What is claimed is:

1. An information processing apparatus comprising:
    at least one processor operatively coupled to a memory, serving as:
    an acquisition unit constructed to receive an input of first encrypted data generated by encrypting plaintext data using a first key according to a common key cryptography, and second encrypted data generated by encrypting the first key using the first key according to the common key cryptography, wherein the first encrypted data and second encrypted data are output from an encryption unit;
    a determination unit constructed to determine whether or not a second key matches second decrypted data which is generated by decrypting the second encrypted data using the second key according to the common key cryptography; and
    a decryption unit constructed to determine that the plaintext data can be obtained by decrypting the first encrypted data using the second key according to the common key cryptography and to decrypt the first encrypted data using the second key according to the common key cryptography when said determination unit determines that the second key matches the second decrypted data, and not to decrypt the first encrypted data using the second key according to the common key cryptography when said determination unit determines that the second key does not match the second decrypted data.

2. An information processing method using a computer to perform the steps of:
    an acquisition step of receiving an input of first encrypted data generated by encrypting plaintext data using a first key, according to a common key cryptography, and second encrypted data generated by encrypting the first key using the first key according to the common key cryptography, wherein the first encrypted data and second encrypted data are output from an encryption unit;
    a determination step of determining whether or not a second key matches second decrypted data which is generated by decrypting the second encrypted data using the second key according to the common key cryptography; and
    a decryption step of determining that the plaintext data can be obtained by decrypting the first encrypted data using the second key according to the common key cryptography and decrypting the first encrypted data using the second key according to the common key cryptography when it is determined in the determination step that the second key matches the second decrypted data, and not decrypting the first encrypted data using the second key according to the common key cryptography when it is determined in the determination step that the second key does not match the second decrypted data.

3. A non-transitory computer-readable storage medium for storing a computer program for making a computer execute an information processing method according to claim 2.

* * * * *